US012434402B2

(12) United States Patent
Kim

(10) Patent No.: US 12,434,402 B2
(45) Date of Patent: Oct. 7, 2025

(54) PRESS PUNCHING DEVICE

(71) Applicant: Man Hyun Kim, Incheon (KR)

(72) Inventor: Man Hyun Kim, Incheon (KR)

( * ) Notice: Subject to any disclaimer, the term of this patent is extended or adjusted under 35 U.S.C. 154(b) by 307 days.

(21) Appl. No.: 18/133,307

(22) Filed: Apr. 11, 2023

(65) Prior Publication Data

US 2024/0342943 A1 Oct. 17, 2024

(51) Int. Cl.

| | |
|---|---|
| ***B26F 1/42*** | (2006.01) |
| ***C14B 5/00*** | (2006.01) |
| ***D06N 3/00*** | (2006.01) |
| *B26D 7/00* | (2006.01) |

(52) U.S. Cl.

CPC ........ *B26F 1/42* (2013.01); *B26D 2007/0018* (2013.01); *C14B 5/00* (2013.01); *C14B 2700/116* (2013.01); *D06N 3/0054* (2013.01)

(58) Field of Classification Search

CPC ... C14B 2700/116; C14B 5/02; D06N 3/0054; B26F 1/24; B26F 1/42

See application file for complete search history.

(56) References Cited

U.S. PATENT DOCUMENTS

| | | | | |
|---|---|---|---|---|
| 1,920,258 A * | 8/1933 | Hardenbrook, Jr. | ...... | C14B 5/02 83/133 |
| 2019/0193295 A1 * | 6/2019 | Jeng | .......................... | B26F 1/24 |

FOREIGN PATENT DOCUMENTS

| | | | | |
|---|---|---|---|---|
| KR | 200481072 Y1 * | 8/2016 | .............. | C14B 5/00 |
| KR | 10-2137134 B1 | 7/2020 | | |
| KR | 10-2022-0098579 A | 7/2022 | | |
| KR | 10-2022-0098657 A | 7/2022 | | |
| KR | 10-2022-0134990 A | 10/2022 | | |
| KR | 10-2022-0134991 A | 10/2022 | | |
| KR | 10-2022-0134992 A | 10/2022 | | |

OTHER PUBLICATIONS

English language translation of KR-200481072-Y1 to Park.*

* cited by examiner

*Primary Examiner* — Evan H MacFarlane

(74) *Attorney, Agent, or Firm* — Stein IP, LLC

(57) ABSTRACT

A press punching device has a reinforcing plate. The press punching device includes: a punching jig configured such that a plurality of punching needles having respective through holes are coupled thereto; a reinforcing plate formed at the bottom end of the punching jig, and configured to support the punching jig; a support block formed at the bottom end of the reinforcing plate, and configured to support the reinforcing plate; a base plate formed at the bottom end of the support block, and configured to be movable in a lateral straight line; and one or more rollers configured to press a base material seated on the punching jig.

8 Claims, 16 Drawing Sheets

PRESS PUNCHING DEVICE

BACKGROUND

1. Technical Field

The present invention relates generally to a press punching device having a reinforcing plate, and more particularly to a press punching device in which a punching jig on which a base material such as leather is seated is pressed by rollers while being moved so that a punching operation is performed on the base material, wherein a reinforcing plate provided with support surface blocks and support plates is formed at the bottom end of the punching jig, so that the punching jig may be prevented from being bent by the pressing load of the rollers and, at the same time, the scraps generated by a punching operation may be efficiently removed, thereby improving the manufacturing efficiency.

2. Description of the Related Art

A car seat that provides safety and comfort to a driver loses air permeability when it is kept in close contact with the driver's body for a long time. Accordingly, in summer, even when an air conditioner is turned on, a contact area is not cooled, so that the driver feels discomfort due to the increase in body temperature.

Moreover, as the temperature of a body region in contact with the seat rises, sweat is generated and this further increases the discomfort felt by the driver, which directly acts as a factor that impairs driving concentration. An automobile seat has been proposed in which a plurality of small ventilation holes are formed in a seat fabric such as leather to allow cool air to pass through the seat fabric toward the driver's back and buttocks by forcibly sucking in the internal air of an automobile. Furthermore, seat fabrics such as leather having ventilation holes are widely used not only for back rests for vehicles but also for furniture.

In general, sheet fabrics such as leather having ventilation holes are manufactured in various sizes and shapes through punching processes using press punching equipment having upper and lower dies.

However, conventionally, an operator has to remove the scraps, formed in the area where punching is performed, by using a compressor after the punching has been completed. Accordingly, problems arise in that the manufacturing efficiency is decreased and also the manufacturing cost is increased because it takes a long time to remove scraps and in that there occur accidents such as an accident in which scraps or fine dust generated during a punching operation enter the bronchi of an operator.

Furthermore, conventionally, as scraps are removed manually, it is difficult to completely remove scraps. Accordingly, problems arise in that defects are caused in products because a subsequent process is performed in a state in which scraps are attached to a base material, or an overall process is delayed because scraps must be removed again during the subsequent process.

Moreover, conventionally, punching is performed in such a manner that a punching blade penetrates a base material by applying pressure to a jig in a state in which the base material is placed on the jig. Upon punching, a high pressing load is transmitted to the jig, so that a problem arises in that the jig is bent or twisted.

Meanwhile, as a prior art related to the punching device, there is Korean Patent No. 10-2137134.

SUMMARY

The present invention has been conceived to overcome the above-described problems, and an object of the present invention is to provide a press punching device in which a punching jig on which a base material such as leather is seated is pressed by rollers while being moved so that a punching operation is performed on the base material, wherein a reinforcing plate provided with support surface blocks and support plates is formed at the bottom end of the punching jig, so that the punching jig may be prevented from being bent by the pressing load of the rollers and, at the same time, the scraps generated by a punching operation may be efficiently removed, thereby improving the manufacturing efficiency.

The objected to be solved by the present invention are not limited to the object described above, and other objects not described will be clearly understood by those skilled in the art from the following description.

According to an aspect of the present invention, there is provided a press punching device, including: a punching jig configured such that a plurality of punching needles having respective through holes are coupled thereto; a reinforcing plate formed at the bottom end of the punching jig, and configured to support the punching jig; a support block formed at the bottom end of the reinforcing plate, and configured to support the reinforcing plate; a base plate formed at the bottom end of the support block, and configured to be movable in a lateral straight line; and one or more rollers configured to press a base material seated on the punching jig.

The reinforcing plate may include: a main frame configured to support circumferential edges of the punching jig at the bottom end of the punching jig; and a plurality of reinforcing frames formed inside the main frame.

A plurality of support surface blocks configured to support the punching jig may be formed at the top ends of the reinforcing frames of the reinforcing plate.

Pluralities of through holes may be formed inside the support surface blocks and inside the reinforcing frames located at bottom ends of the support surface blocks.

A plurality of support feet may be formed at the bottom ends of the reinforcing frames of the reinforcing plate.

A plurality of support plates may be formed in the spaces between the reinforcing frames of the reinforcing plate and/or in the spaces between the main frame and the reinforcing frames.

One or more inclined surfaces may be formed on the top end surface of each of the support plates.

The inner space of the support block may be used as a storage space for scraps.

The reinforcing frames of the reinforcing plate may be formed to have a thinner vertical thickness than the main frame, so that the reinforcing frames are spaced apart from the bottom surface of the punching jig by a predetermined distance.

One or more inclined surfaces may be formed at the top end of each of the reinforcing frames.

The present invention is directed to the press punching device in which the punching jig on which a base material such as leather is seated is pressed by the rollers while being moved so that a punching operation is performed on the base material, wherein the reinforcing plate provided with the support surface blocks and the support plates is formed at the bottom end of the punching jig. Accordingly, the punching jig may be prevented from being bent by the pressing load of the rollers and, at the same time, the scraps generated by a punching operation may be efficiently removed, so that the manufacturing efficiency may be improved.

In other words, the main frame of the reinforcing plate supports the circumferential edges of the punching jig and, at the same time, the plurality of support surface blocks formed at the top ends of the reinforcing frames of the reinforcing plate support a plurality of points at the bottom end of the punching jig. Furthermore, the support block supports the main frame of the reinforcing plate at the bottom end of the main frame, and the plurality of support feet formed at the bottom ends of the reinforcing frames of the reinforcing plate support the reinforcing frames of the reinforcing plate at the bottom ends of the reinforcing frames. Accordingly, the punching jig may be prevented from being bent when pressing load is applied to the punching jig by the rollers, so that accurate punching may be performed on the base material and also the cost required to replace the punching jig may be reduced.

Furthermore, the plurality of support plates are formed in the spaces between the reinforcing frames of the reinforcing plate, so that the reinforcing frames may be prevented from being bent when pressure is applied to the reinforcing frames.

In addition, a part of the scraps generated by a punching operation and introduced into the through holes of the punching needles is moved downward as it is introduced into the through holes at the intersections of the support surface blocks and the reinforcing frames, and the remaining part thereof is moved downward as it is bounced off the inclined surfaces of the support plates. Accordingly, as soon as a punching operation is performed on the base material, scraps are immediately removed. As a result, scraps may be completely removed from the base material by a simple method, and also manufacturing defects due to the presence of scraps are reduced.

Furthermore, as the punching jig on which a base material is seated is moved and pressed by the rollers, pressure is applied only through the bottom dead center of the rollers during punching, so that the impact transmitted to the base material and the punching needles may be reduced. Accordingly, the base material may be prevented from being severely pushed, bent or twisted by a strong impact, so that accurate punching may be performed and also damage to the punching needles may be prevented.

Moreover, a base material is pressed using the plurality of auxiliary rollers together with the main roller, so that the base material may be prevented from being pushed, bent or twisted. Accordingly, accurate punching may be performed, and the quality of products may be improved accordingly.

The effects of the present invention are not limited to the effects described above, and other effects not described will be clearly understood by those skilled in the art from the description of the claims.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described below with reference to the accompanying drawings. However, although some configurations irrelevant to the gist of the present invention will be omitted or abridged, the omitted configurations are not necessarily needless in the present invention and may be combined and used by those having ordinary skill in the art to which the present invention pertains.

Figure 1:
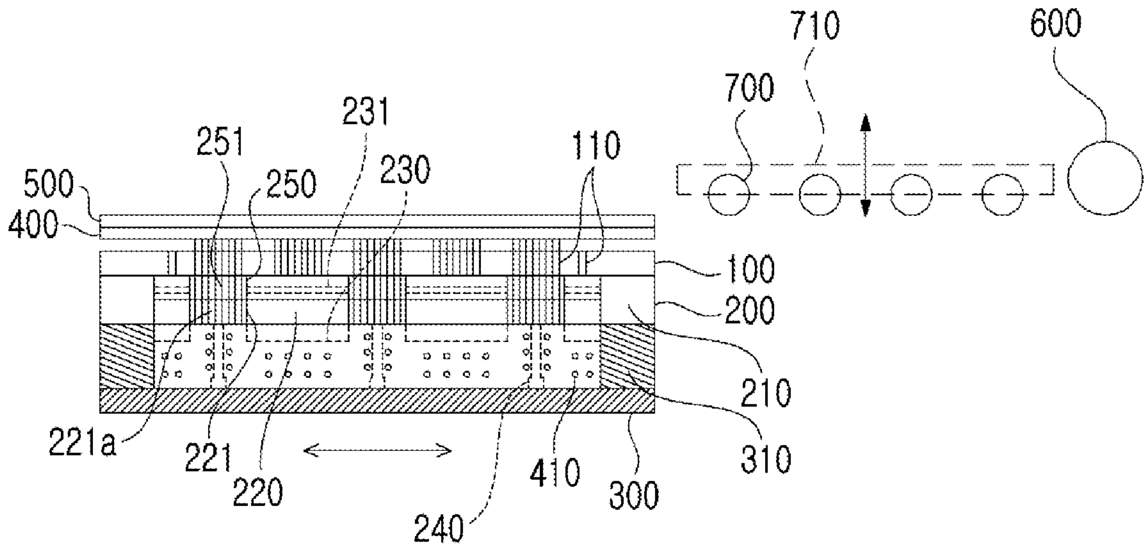
FIG. 1 is a schematic cross-sectional view showing the configuration of a press punching device having a reinforcing plate according to a first embodiment of the present invention.
Figure 2:
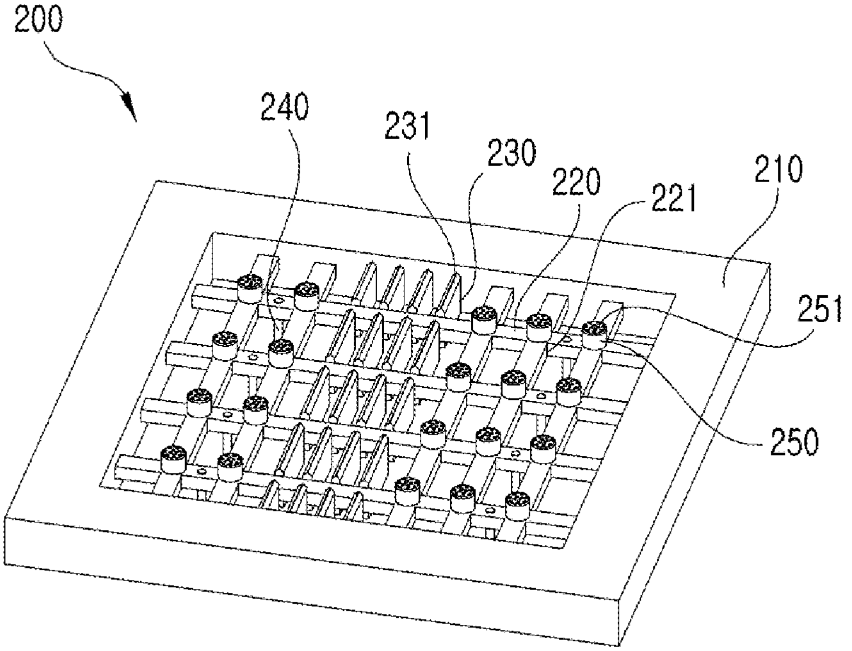
FIG. 2 is a perspective view of the reinforcing plate of the press punching device having a reinforcing plate according to the first embodiment of the present invention.
Figure 3:
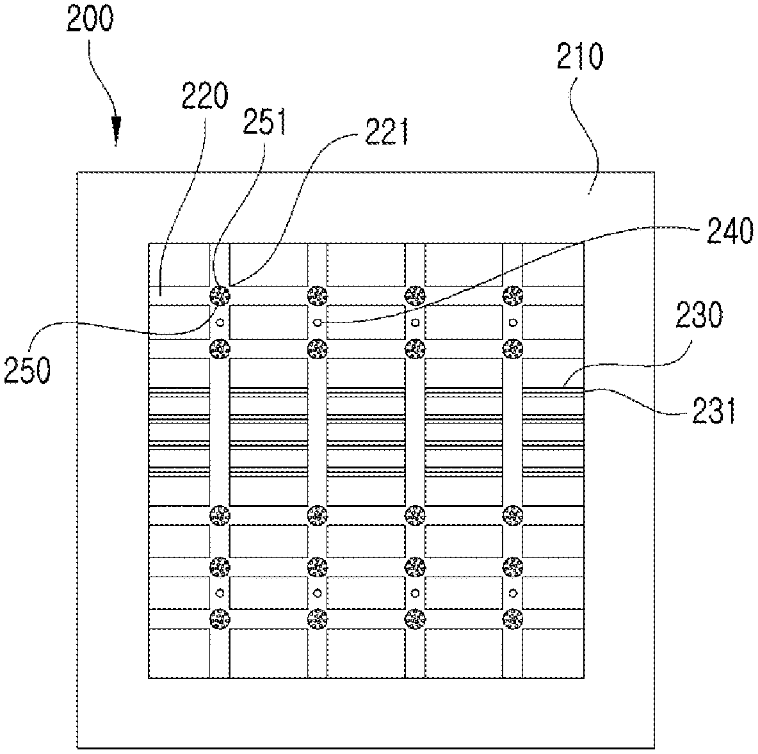
FIG. 3 is a plan view of the reinforcing plate of the configuration of the reinforcing plate of the press punching device having a reinforcing plate according to the first embodiment of the present invention.
Figure 4:
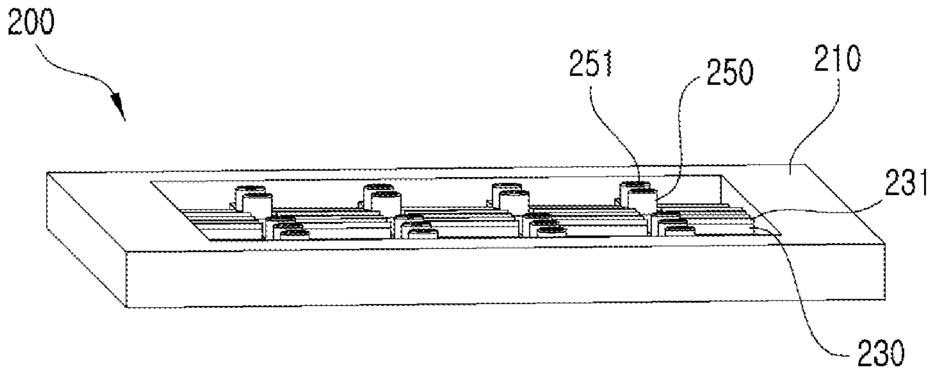
FIG. 4 is a front perspective view of the reinforcing plate of the press punching device having a reinforcing plate according to the first embodiment of the present invention.
Figure 5:
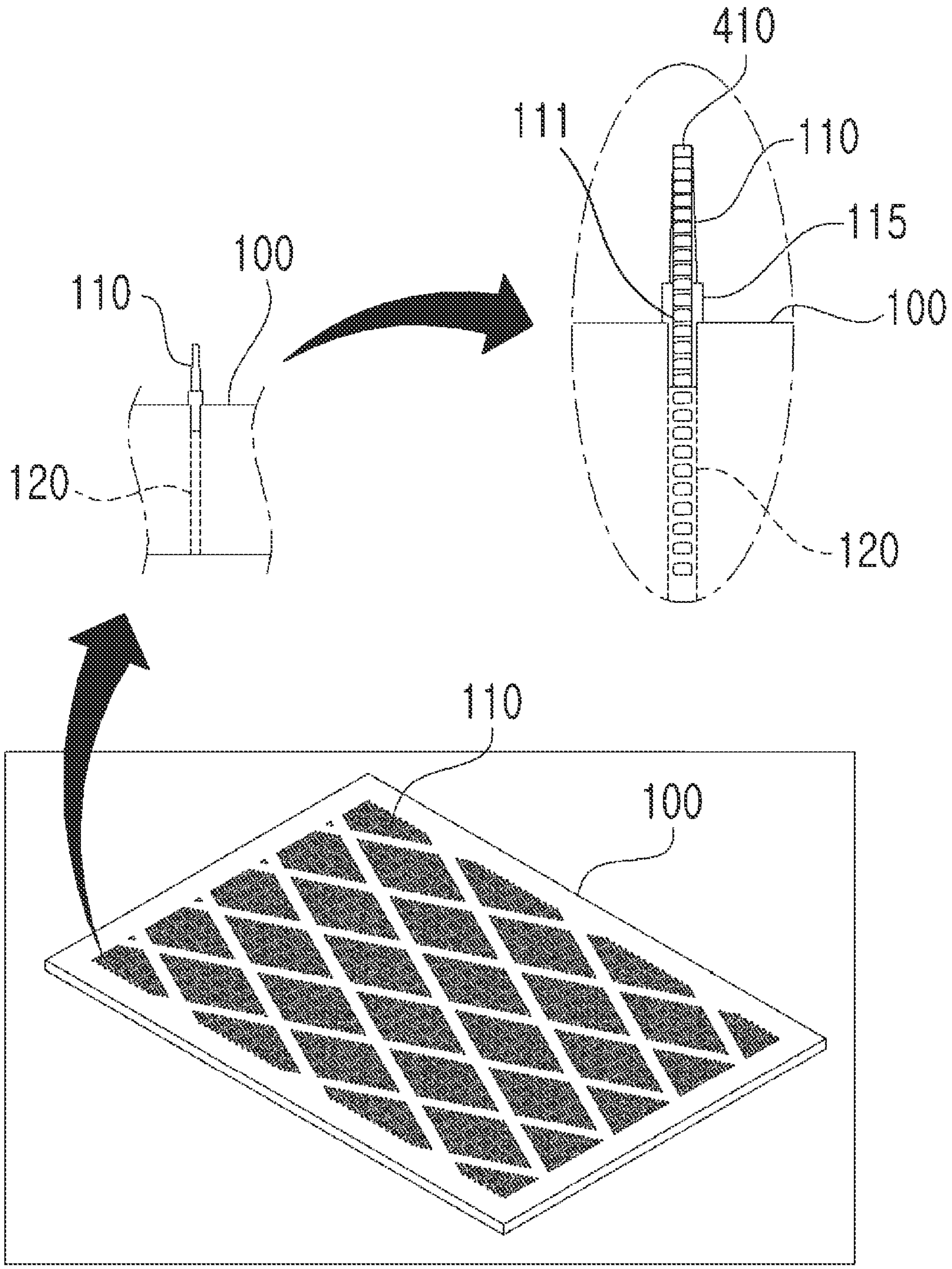
FIG. 5 is a view showing the punching jig and punching needles of the press punching device having a reinforcing plate according to the first embodiment of the present invention.

FIG. 1 is a schematic cross-sectional view showing the configuration of a press punching device having a reinforcing plate according to a first embodiment of the present invention, FIG. 2 is a perspective view of the reinforcing plate of the press punching device having a reinforcing plate according to the first embodiment of the present invention, FIG. 3 is a plan view of the reinforcing plate of the configuration of the reinforcing plate of the press punching device having a reinforcing plate according to the first embodiment of the present invention, FIG. 4 is a front perspective view of the reinforcing plate of the press punching device having a reinforcing plate according to the first embodiment of the present invention, and FIG. 5 is a view showing the punching jig and punching needles of the press punching device having a reinforcing plate according to the first embodiment of the present invention.

As shown in FIGS. 1 to 5, the press punching device (hereinafter referred to as the "press punching device") having a reinforcing plate according to the first embodiment of the present invention is configured to include: a punching jig 100 configured such that a base material 400 such as leather is seated thereon; a reinforcing plate 200 formed at the bottom end of the punching jig 100, and configured to support the punching jig 100; a support block 310 formed at the bottom end of the reinforcing plate 200, and configured to support the reinforcing plate 200; a base plate 300 formed at the bottom end of the support block 310, and configured to be movable in a lateral straight line; and a main roller 600 and a plurality of auxiliary rollers 700 configured to press the base material 400 such as leather.

The punching jig 100 is configured such that the base material 400 such as leather is seated thereon. A plurality of through holes 120 are formed in the punching jig 100, and a plurality of punching needles 110 are fitted into the through holes 120. As shown in FIG. 5, the punching needles 110 are fitted to protrude from the top surface of the punching jig 100 and form ventilation holes in the base material 400 such as leather. Stop protrusions 115 are formed on both sides of the upper end portion of each of the punching needles 110 so that the punching needle 110 is not pushed downward even when pressure is applied thereto. Furthermore, a through hole 111 through which scraps 410 generated as a punching operation is performed on the base material 400 such as leather can be introduced and move downward is formed through the center portion of the punching needle 110. In this case, a series of patterns formed by coupling the plurality of punching needles 110 to the punching jig 100 may be formed in various patterns to fit a design desired by a user other than the patterns shown in FIG. 5.

The reinforcing plate 200 is formed at the bottom end of the punching jig 100 and serves to support the punching jig 100. The reinforcing plate 200 includes a main frame 210, a plurality of reinforcing frames 220 formed inside the main frame 210, a plurality of support surface blocks 250 formed at the upper end of the reinforcing frame 220, a plurality of support feet 240 formed at the bottom end of the reinforcing frame 220, and a plurality of support plates 230 formed in the spaces between the reinforcing frames 220 and the spaces between the main frame 210 and the reinforcing frames 220.

The main frame 210 is formed in a rectangular shape with a space formed therein, and serves to support the circumferential edges of the punching jig 100 at the bottom end of the punching jig 100.

The plurality of reinforcing frames 220 are formed in the inner space of the main frame 210, and serve to prevent the punching jig 100 from being bent when pressure is applied to the punching jig 100. The plurality of linear reinforcing frames 220 are formed in the inner space of the main frame 210 in a form in which they are orthogonal to each other.

The plurality of support surface blocks 250 are formed at the top ends of intersections 221 between the reinforcing frames 220, and come into contact with a plurality of points on the bottom surface of the punching jig 100 and support the punching jig 100. A plurality of through holes 251 are formed inside the support surface blocks 250 and formed to have the same number at the same locations as the plurality of through holes 120 of the punching jig 100, so that the pluralities of through holes 120 and 251 formed in the punching jig 100 and the support surface block 250 communicate with each other. Furthermore, a plurality of through holes 221*a* communicating with the through holes 251 of the support surface blocks 250 are formed at the intersections 221 of the reinforcing frames 220 located at the bottom ends of the support surface blocks 250. In this case, the diameter of the through holes 251 of the support surface blocks 250 is formed to be equal to or larger than the diameter of the through holes 120 of the punching jig 100, and the diameter of the through holes 221*a* formed at the intersections 221 of the reinforcing frames 220 are formed to be equal to or larger than the diameter of the through holes 251 of the support surface blocks 250. Accordingly, the pluralities of through holes 120, 251, and 221*a* respectively formed at the punching jig 100, the support surface blocks 250, and the intersections 221 of the reinforcing frames 220 communicate with each other, and provide passages through which the scraps 410 introduced into the through holes 111 of the punching needles 110 can move downward during a punching operation. In this case, the locations at which the support surface blocks 250 are formed are not limited to the locations shown in the drawings. When the locations of the punching needles 110 formed in the punching jig 100 are changed according to a design desired by a user, the locations at which the support surface blocks 250 are formed may be variously changed accordingly.

The plurality of support feet 240 are formed at the bottom ends of the reinforcing frames 220 and serve to support the reinforcing plate 200.

As shown in FIGS. 2 and 3, the support plates 230 are formed in the spaces between the reinforcing frames 220 and the spaces between the main frame 210 and the reinforcing frames 220 so that they prevent the reinforcing plate 200 from being bent when pressure is applied to the reinforcing plate 200. Inclined surfaces 231 are formed on the top surface of each of the support plates 230 in both directions, and the uppermost height of the inclined surfaces 231 is formed to be located at the middle of the height of the support surface blocks 250 so that the inclined surfaces 231 can be spaced apart from the bottom surface of the punching jig 100 by a predetermined distance. Accordingly, the scraps 410 moving downward through the through holes 111 of the punching needles 110 collide with the inclined surfaces 231 of the support plates 230, are bounced off the inclined surfaces 231, and are then moved downward. In this case, although the bottom ends of the support plates 230 are shown as not being in contact with the base plate 300 in the drawing, the bottom ends of the support plates 230 may be formed to come into contact with the base plate 300 if necessary. Furthermore, the locations at which the support plates 230 are formed are not limited to the locations shown in the drawings. When the locations of the punching needles 110 formed in the punching jig 100 are changed according to a design desired by a user, the locations at which the support plates 230 are formed may be variously changed accordingly.

Meanwhile, the support block 310 is formed in a rectangular shape with a space formed inside and serves to support the main frame 210 of the reinforcing plate 200 at the bottom end of the main frame 210. The overall inner space of the support block 310 is used as a storage space for the scraps 410. Accordingly, the overall inner space of a container having a height equal to the height of the support block 310 may be utilized as a storage space for the scraps 410, and thus a punching operation may be continuously performed for a long time without removing the scraps 410.

The base plate 300 is formed to be able to linearly move left and right, so that the punching jig 100 on which the base material 400 is seated is moved left and right so that it is pressed by the rollers 600 and 700 to be described later.

The main roller 600 and the plurality of auxiliary rollers 700 are provided to press the base material 400, such as leather, seated on the punching jig 100. In this case, the plurality of auxiliary rollers 700 are coupled to a driving unit 710 capable of moving up and down, are lowered to press the base material 400 during the operation of punching the base material 400, and are raised back to their original positions when the punching operation is completed.

Meanwhile, although not shown in the drawings, a control unit (not shown) configured to control individual components of the press punching device according to a preset program is provided separately.

The operation of the press punching device according to the first embodiment of the present invention configured as described above will be described as follows.

First, as shown in FIG. 1, the base material 400, such as leather, is placed on the top surface of the punching jig 100 to which the punching needles 110 are coupled, and then a buffer material 500 is placed on the top surface of the base material 400. In this case, the buffer material 500 prevents the punching needles 100 from being damaged by alleviating the impact applied to the punching needles 110 by the pressing force of the main roller 600 and the plurality of auxiliary rollers 700. The buffer material 500 may be made of a resin material, but is not limited thereto.

Thereafter, in response to a control signal from the control unit (not shown), the plurality of auxiliary rollers 700 coupled to the driving unit 710 are lowered, and the punching jig 100 is linearly moved to the right on the drawing by the base plate 300.

As the punching jig 100 is linearly moved to the right on the drawing, the base material 400 such as leather seated on the top surface of the punching jig 100 is brought into contact with and pressed against the punching needles 110 sequentially by the plurality of auxiliary rollers 700 and the main roller 600, and then a plurality of through holes are formed in the base material 400 such as leather according to a design desired by a user.

When the punching jig 100 is moved to the left on the drawing and returned to its original position after the punching operation has been completed as described above, a base material 400 such as leather for a new operation is seated on the punching jig 100, and then the above-described process is repeated to perform a new punching operation.

In this case, the punching jig 100 may be bent due to the strong pressing load applied to the punching jig 100 by the rollers 600 and 700 during the punching operation. In the present invention, the punching jig 100 may be prevented from being bent by forming the reinforcing plate 200 at the bottom end of the punching jig 100.

More specifically, the press punching device of the present invention is configured such that the main frame 210 of the reinforcing plate 200 supports the circumferential edges of the punching jig 100 at the bottom end of the punching jig 100 and, at the same time, the plurality of support surface blocks 250 formed at the top ends of the reinforcing frames 220 of the reinforcing plate 200 support a plurality of points at the bottom end of the punching jig 100. The press punching device of the present invention is further configured such that the support block 310 supports the main frame 210 of the reinforcing plate 200 at the bottom end of the main frame 210, the plurality of support feet 240 formed at the bottom ends of the reinforcing frames 220 of the reinforcing plate 200 support the reinforcing frames 220 at the bottom end of the reinforcing frames 220, and the support plates 230 formed in the spaces between the reinforcing frames 220 of the reinforcing plate 200 and the spaces between the main frame 210 and the reinforcing frames 220 prevent the reinforcing plate 200 from being bent when pressure is applied to the reinforcing plate 200. Accordingly, the punching jig 100 to which pressing load is directly applied by the rollers 600 and 700 is firmly supported by the reinforcing plate 200, and the reinforcing plate 200 supporting the punching jig 100 is firmly supported by the support block 310, the support feet 240, and the support plates 230. As a result, the punching jig 100 is prevented from being bent when pressure is applied to the punching jig 100 by the rollers 600 and 700, so that accurate punching may be performed on the base material 400 and also the cost required to replace the punching jig 100 may be reduced.

Meanwhile, as shown in FIG. 5, the scraps 410 generated during the operation of punching the base material 400 such as leather are immediately introduced into the through holes 111 formed through the center portions of the punching needles 110, and the introduced scraps 410 are moved downward while being pushed downward as the scraps 410 sequentially generated during the operation of punching other base materials 400 are introduced into the through holes 111 of the punching needles 110.

In this case, in the areas where the support surface blocks 250 are formed, the scraps 410 are moved downward through the through holes 120, 251, and 221*a* formed in the punching jig 100, the support surface blocks 250, and the intersections 221 of the reinforcing frames 220, and are collected in the inner space (storage space) of the support block 310. In the areas where the support plates 230 are formed, the scraps 410 moving downward through the through holes 111 of the punching needles 110 and the through holes 120 of the punching jig 100 collide with the inclined surfaces 231 of the upper end surfaces of the support plates 230, are bounced off the inclined surfaces 231, and are then collected in the inner space (storage space) of the support block 310.

In this manner, the scraps 410 first introduced into the through holes 111 of the punching needles 110 are moved downward while being pushed downward by the scraps 410 introduced later, and are collected in the inner space (accommodation space) of the support block 310.

As described above, the press punching device according to the first embodiment of the present invention is configured such that the reinforcing plate 200 provided with the support surface blocks 250 and the support plates 230 is formed at the bottom end of the punching jig 100. Accordingly, the punching jig 100 may be prevented from being bent and, at the same time, the scraps 410 generated by a punching operation may be efficiently removed, so that the manufacturing efficiency may be improved Meanwhile, FIG. 6 is a schematic cross-sectional diagram showing the configuration of a press punching device having a reinforcing plate according to a second embodiment of the present invention, and FIG. 7 is a front perspective view of the reinforcing plate of the press punching device having a reinforcing plate according to the second embodiment of the present invention.

Figure 6:
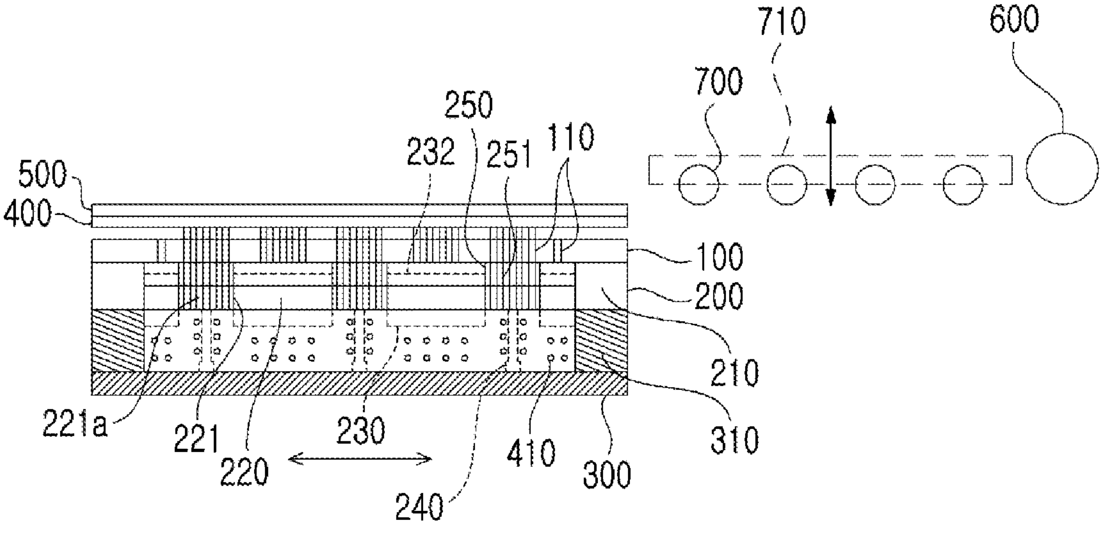
FIG. 6 is a schematic cross-sectional diagram showing the configuration of a press punching device having a reinforcing plate according to a second embodiment of the present invention.
Figure 7:
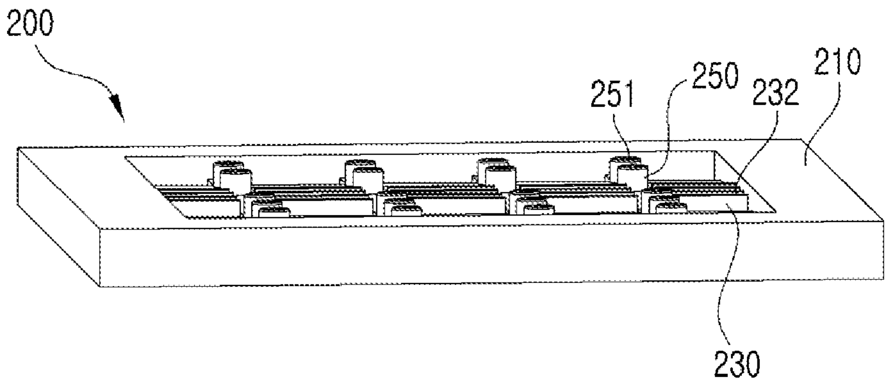
FIG. 7 is a front perspective view of the reinforcing plate of the press punching device having a reinforcing plate according to the second embodiment of the present invention.

As shown in FIGS. 6 and 7, the press punching device according to the second embodiment of the present invention is formed in the same structure as the press punching device of the first embodiment, but the top surfaces 232 of support plates 230 are formed as flat surfaces. Accordingly, during a punching operation, the scraps 410 moving downward through the through holes 111 of punching needles 110 are stacked on the top surfaces 232 of the support plates 230 by a predetermined amount, are then moved downward and collected in the inner space (storage space) of a support block 310. In this case, although the bottom ends of the support plates 230 are shown as not being in contact with a base plate 300 in the drawings, the bottom ends of the support plates 230 may be formed to come into contact with the base plate 300 if necessary. Furthermore, the locations at which the support plates 230 are formed are not limited to the locations shown in the drawings.

Figure 8:
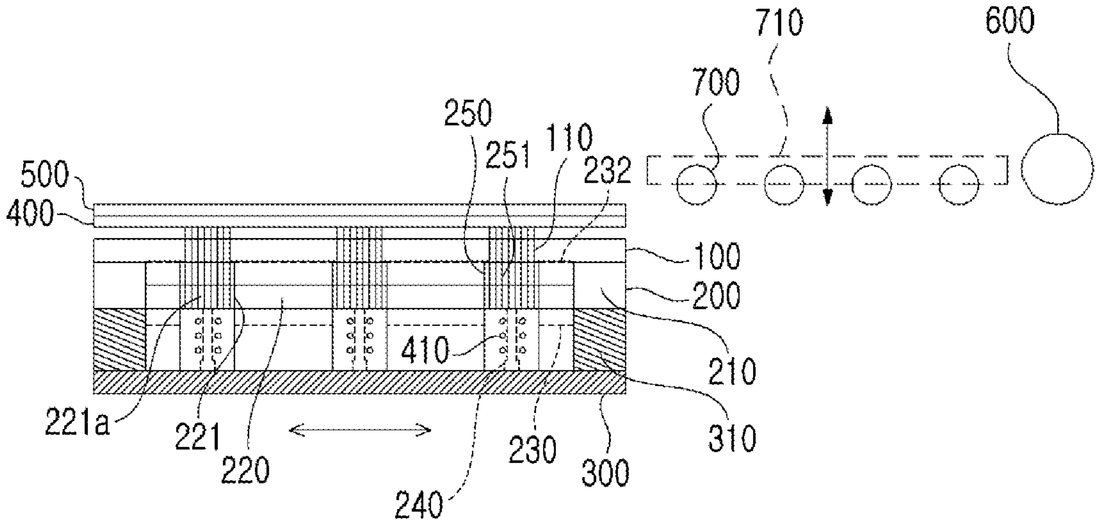
FIG. 8 is a schematic cross-sectional diagram showing the configuration of a press punching device having a reinforcing plate according to a third embodiment of the present invention.
Figure 9:
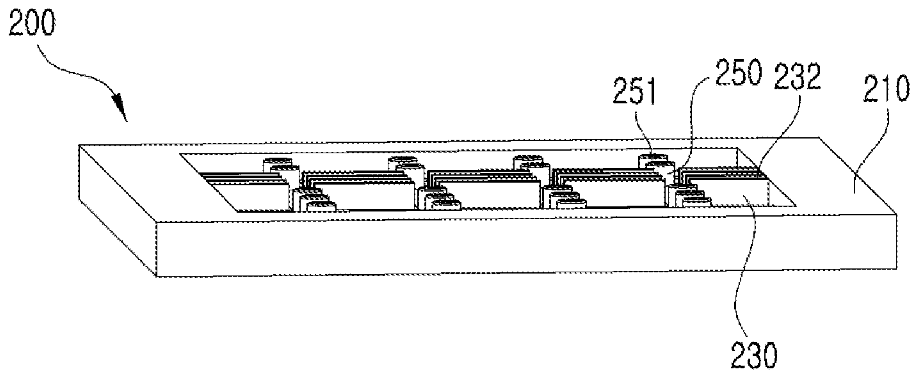
FIG. 9 is a front perspective view of the reinforcing plate of the press punching device having a reinforcing plate according to the third embodiment of the present invention.

Meanwhile, FIG. 8 is a schematic cross-sectional diagram showing the configuration of a press punching device having a reinforcing plate according to a third embodiment of the present invention, and FIG. 9 is a front perspective view of the reinforcing plate of the press punching device having a reinforcing plate according to the third embodiment of the present invention.

As shown in FIGS. 8 and 9, the press punching device according to the third embodiment of the present invention is formed in the same structure as the press punching device of the first embodiment, but the top surfaces 232 of the support plates 230 are formed as flat surfaces and come into contact with the bottom surface of the punching jig 100. Furthermore, as the top surfaces 232 of the support plates 230 come into contact with the bottom surface of the punching jig 100, there is no space to which scraps 410 are moved downward, so that the support plates 230 are provided only at locations where the punching needles 110 are not formed in the bottom surface of the punching jig 100. Accordingly, the support plates 230 along with the main frame 210 and support surface blocks 250 of the reinforcing plate 200 also support the punching jig 100 at the bottom end of the punching jig 100, thereby supporting the punching jig 100 more firmly. As a result, when pressure is applied to the punching jig 100 by the rollers 600 and 700, the punching jig 100 may be prevented from being bent. In this case, although the bottom ends of the support plates 230 are shown as not being in contact with a base plate 300 in the drawings, supporting force may be improved by forming the bottom ends of the support plates 230 so that they come into contact with the base plate 300 if necessary. Furthermore, the locations at which the support plates 230 are formed are not limited to the locations shown in the drawings. When the locations of the punching needles 110 formed in the punching jig 100 are changed according to a design desired by a user, the locations at which the support plates 230 are formed may be variously changed accordingly.

Figure 10:
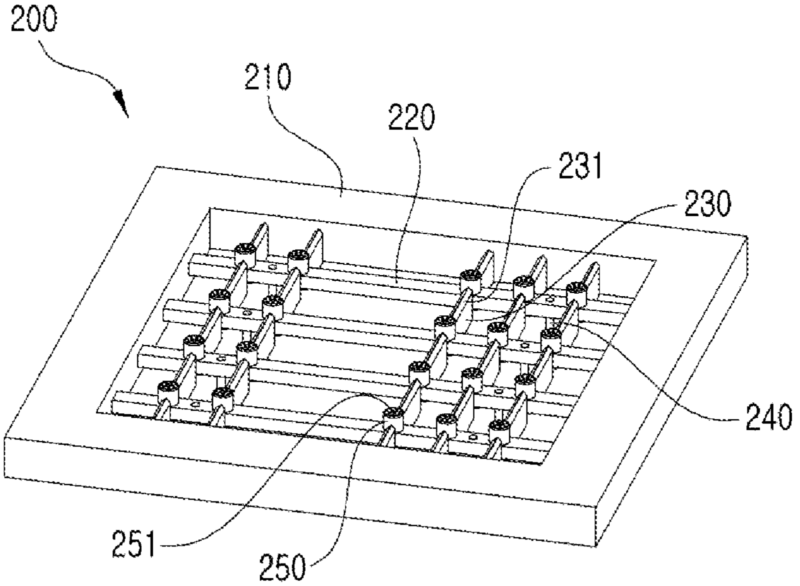
FIG. 10 is a perspective view of the reinforcing plate of a press punching device having a reinforcing plate according to a fourth embodiment of the present invention.

Meanwhile, FIG. 10 is a perspective view of the reinforcing plate of a press punching device having a reinforcing plate according to a fourth embodiment of the present invention.

As shown in FIG. 10, the press punching device according to the fourth embodiment of the present invention is formed in the same structure as the press punching device of the first embodiment, but the reinforcing frames 220 of the reinforcing plate 200 are formed in parallel and support plates 230 on which inclined surfaces 231 are formed are formed between support surface blocks 250. In this case, although the bottom ends of the support plates 230 are shown as not being in contact with a base plate 300 in the drawing, the bottom ends of the support plates 230 may be formed to come into contact with the base plate 300 if necessary. Furthermore, the locations at which the support plates 230 are formed are not limited to the locations shown in the drawing. When the locations of the punching needles 110 formed in the punching jig 100 are changed according to a design desired by a user, the locations at which the support plates 230 are formed may be variously changed accordingly.

Figure 11:
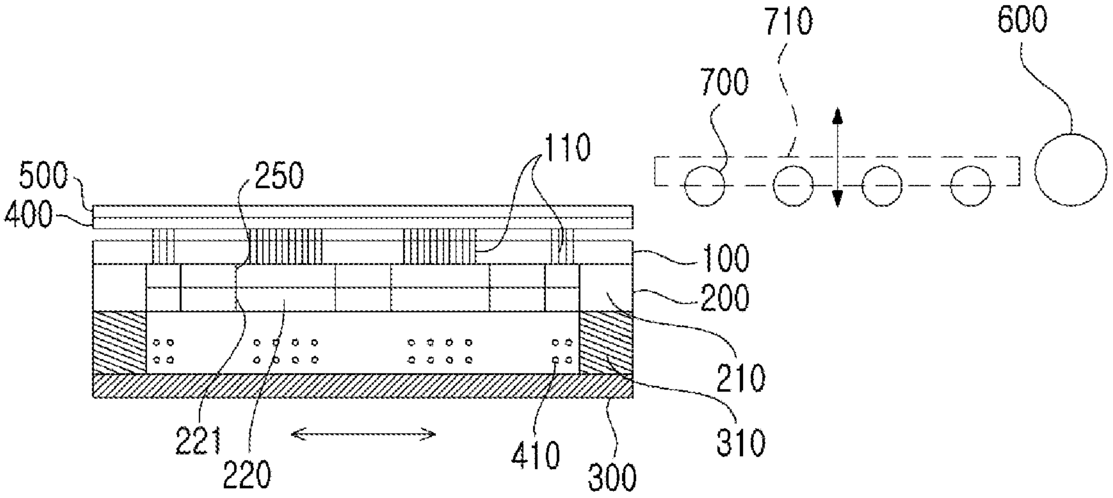
FIG. 11 is a schematic cross-sectional diagram showing the configuration of a press punching device having a reinforcing plate according to a fifth embodiment of the present invention.
Figure 12:
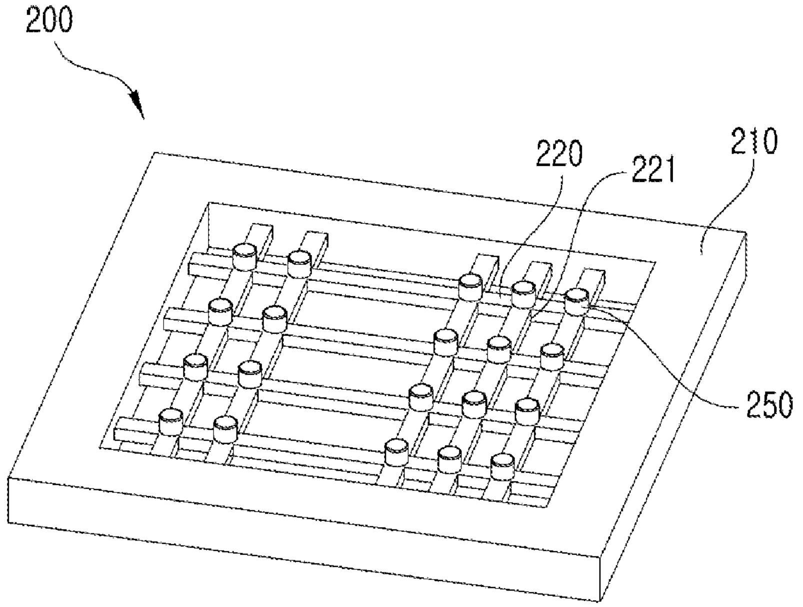
FIG. 12 is a front perspective view of the reinforcing plate of the press punching device having a reinforcing plate according to the fifth embodiment of the present invention.

Meanwhile, FIG. 11 is a schematic cross-sectional diagram showing the configuration of a press punching device having a reinforcing plate according to a fifth embodiment of the present invention, and FIG. 12 is a front perspective view of the reinforcing plate of the press punching device having a reinforcing plate according to the fifth embodiment of the present invention.

As shown in FIGS. 11 and 12, the press punching device according to the fifth embodiment of the present invention is formed in the same structure as the press punching device of the first embodiment, but support plates and support feet are not formed and support surface blocks 250 are formed without through holes to have flat top surfaces and come into contact with the bottom end of the punching jig 100, thereby supporting the punching jig 100. Furthermore, the support surface blocks 250 are formed at the top ends of reinforcing frames 220 at points corresponding to the points where punching needles 110 are not formed in order to support only the points of the punching jig 100 where the punching needles 110 are not formed at the bottom end of the punching jig 100. In other words, when the arrangement of the plurality of punching needles 110 formed in the punching jig 100 is changed to fit a design desired by a user, the locations at which the support surface blocks 250 are formed are also set to the points where the punching needles 110 are not located. The support force of the reinforcing plate 200 for the punching jig 100 is adjusted according to the number of formed support surface blocks 250.

In addition, the reinforcing frames 220 of the reinforcing plate 200 are formed to have a thinner vertical thickness than the main frame 210, so that the main frame 210 and the support surface blocks 250 come into contact with the bottom surface of the punching jig 100 and the reinforcing frames 220 are spaced apart from the bottom end surface of the punching jig 100 by a predetermined distance. Accordingly, even when the reinforcing frames 220 are located at the bottom end of the areas of the punching jig 100 where the punching needles 110 are formed, the scraps 410 moving downward through the through holes 111 of the punching needles 110 during a punching operation are stacked on the top surfaces of the reinforcing frames 220 by a predetermined amount, and are then moved downward and collected in the inner space (storage space) of the support block 310. In other words, even when the reinforcing frames 220 are located at the bottom ends of the areas of the punching jig 100 where the punching needle 110 are formed, the scraps 410 are not prevented from being moved downward to the storage space. Accordingly, the reinforcing plate 200 of the press punching device according to the fifth embodiment of the present invention is applicable to even a case where the punching needles 110 are formed throughout the overall area of the punching jig 100. It is obvious that in this case, through holes 251, which are passages through which the scraps 410 can be moved downward, are also formed in the support surface blocks 250.

As described above, the press punching device according to the fifth embodiment of the present invention may efficiently remove and collect the scraps 410 generated during a punching operation while firmly supporting the punching jig 100 by the support surface blocks 250.

Figure 13:
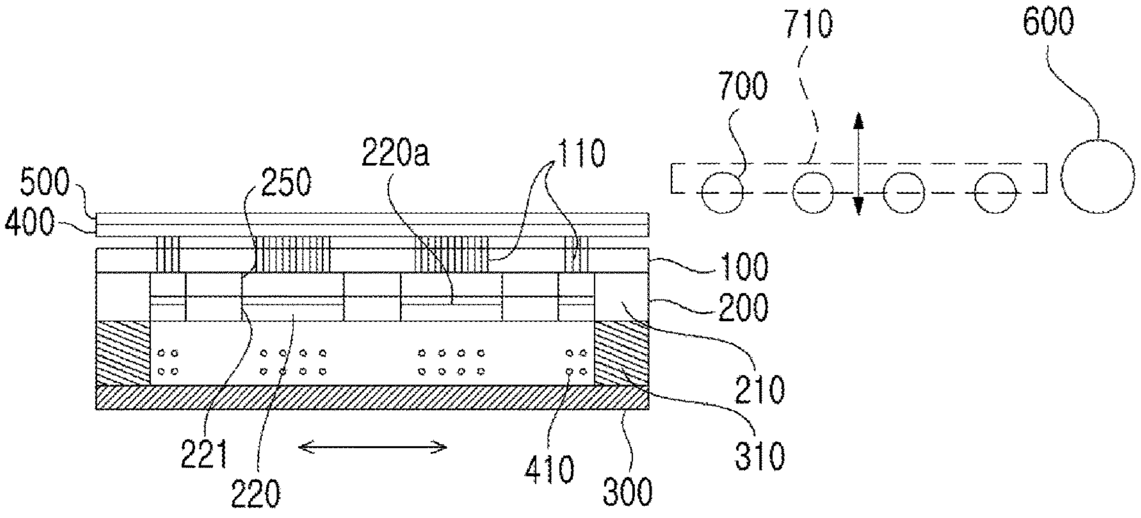
FIG. 13 is a schematic cross-sectional diagram showing the configuration of a press punching device having a reinforcing plate according to a sixth embodiment of the present invention.
Figure 14:
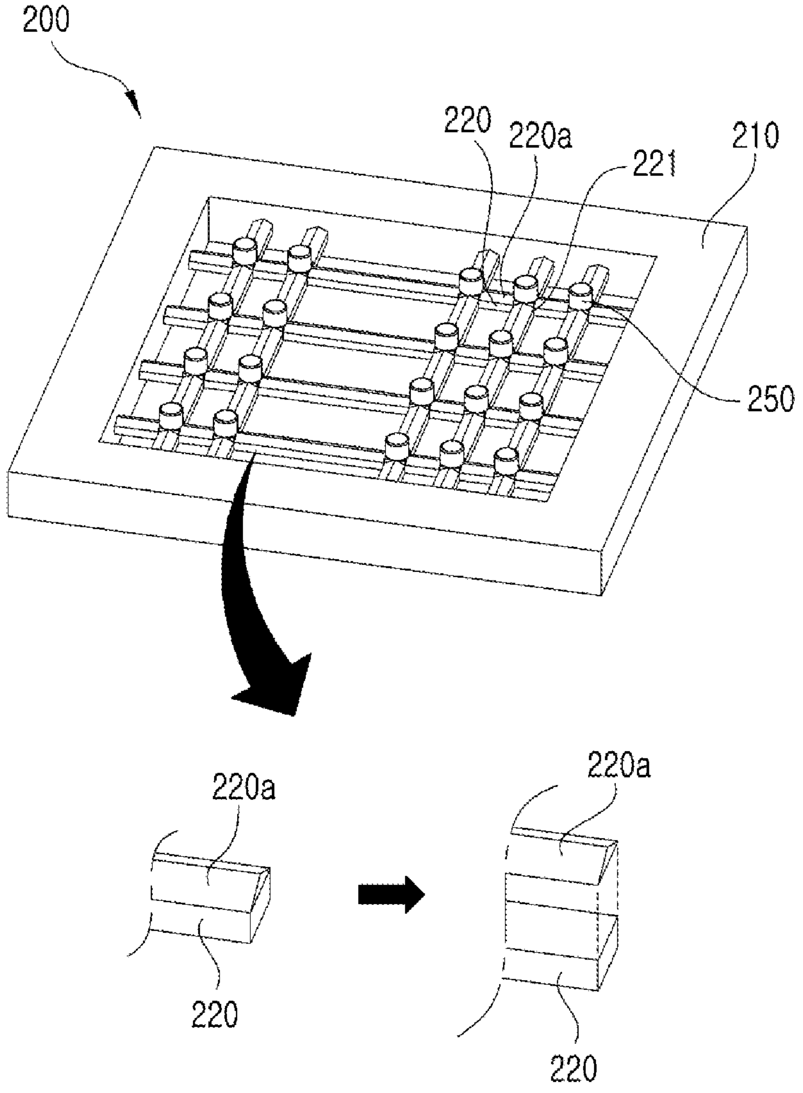
FIG. 14 is a perspective view of the reinforcing plate of the press punching device having a reinforcing plate according to the sixth embodiment of the present invention.

Meanwhile, FIG. 13 is a schematic cross-sectional diagram showing the configuration of a press punching device having a reinforcing plate according to a sixth embodiment of the present invention, and FIG. 14 is a perspective view of the reinforcing plate of the press punching device having a reinforcing plate according to the sixth embodiment of the present invention.

As shown in FIGS. 13 and 14, the press punching device according to the sixth embodiment of the present invention is formed in the same structure as the press punching device of the fifth embodiment, but inclined surfaces 220*a* are formed on the top surface of each reinforcing frame 220 in both directions. Although the inclined surfaces 220*a* are shown as being formed as flat surfaces in FIG. 14, the inclined surfaces 220*a* may be formed as curved surfaces, or the inclined surface 220*a* in both directions may be formed as a curved surface and a flat surface, respectively.

Accordingly, the scraps 410 moving downward through the through holes 111 of the punching needles 110 collide with the inclined surfaces 220*a* of the reinforcing frames 220, and are then bounced off the inclined surfaces 220*a* and moved downward. In other words, it may be possible to prevent the scraps 410 from being stacked on the reinforcing frames 220 and then blocking the bottom surface of the punching jig 100.

In this case, the reinforcing frames 220 and the inclined surfaces 220*a* may be integrated with each other. Alternatively, as shown in FIG. 14, the reinforcing frames 220 and the inclined surfaces 220*a* may be formed as separate parts and may be bonded to each other or attached to each other like magnets.

Figure 15:
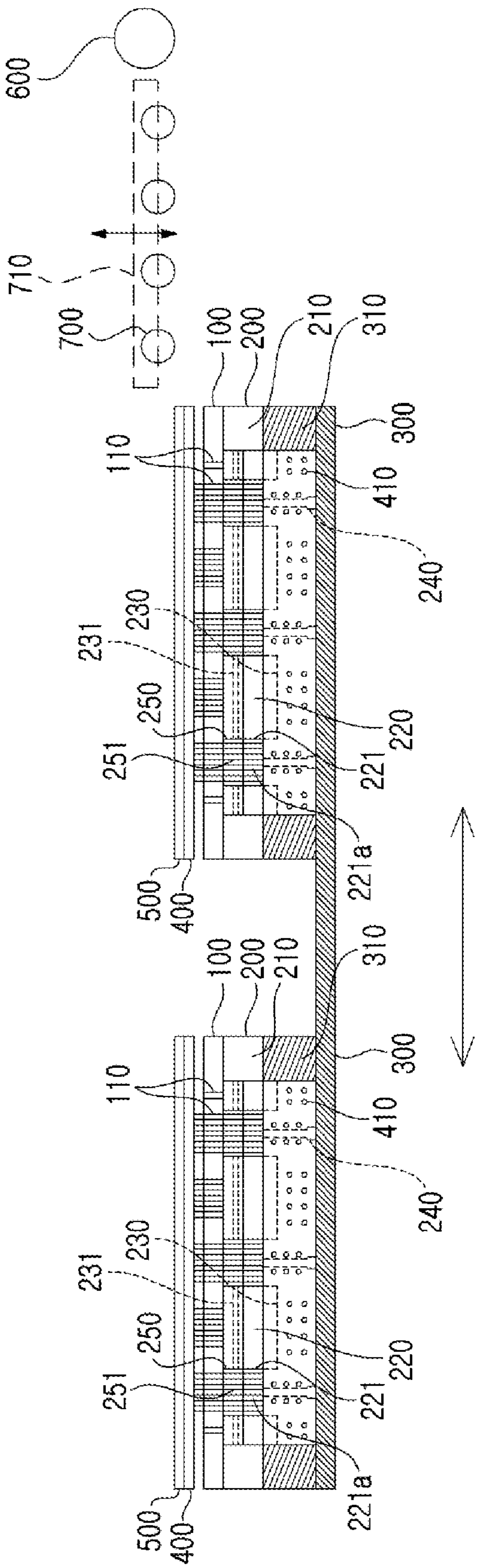
FIGS. 15 and 16 are schematic diagrams showing various operation methods of the press punching device according to the present invention.
Figure 16:
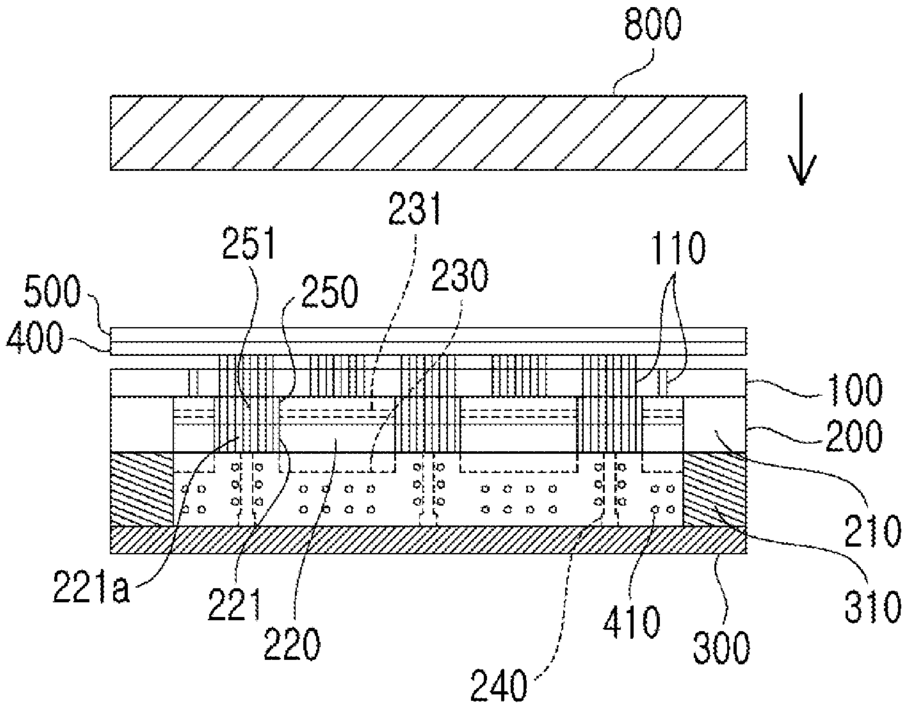

Meanwhile, FIGS. 15 and 16 are schematic diagrams showing various operation methods of the press punching device according to the present invention.

As shown in FIG. 15, in connection with the press punching device according to any one of the first to sixth embodiments of the present invention described above, in a state in which pluralities of punching jigs 100 and reinforcing plates 200, which are components under the punching jigs 100, are arranged in a row, the base materials 400 and the buffer materials 500 may be seated on the plurality of punching jigs 100 and then punching operations may be performed successively. In this case, although two punching jigs 100 and two reinforcing plates 200 are shown as being arranged in FIG. 15, three or more punching jigs 100 and three or more reinforcing plates 200 may be arranged if necessary.

In addition, as shown in FIG. 16, in the press punching device according to any one of the first to sixth embodiments of the present invention described above, a press plate 800 may be formed above the punching jig 100 instead of the rollers 600 and 700, and a punching operation may be performed by lowering the press plate 800 vertically.

As described in detail above, the press punching device having a reinforcing plate according to the present invention is configured such that the reinforcing plate provided with the support surface blocks and the support plates is formed at the bottom end of the punching jig. Accordingly, the punching jig may be prevented from being bent by the pressing load of the rollers and, at the same time, the scraps generated by a punching operation may be efficiently removed, so that the manufacturing efficiency may be improved.

In other words, the main frame of the reinforcing plate supports the circumferential edges of the punching jig and, at the same time, the plurality of support surface blocks formed at the top ends of the reinforcing frames of the reinforcing plate support a plurality of points at the bottom end of the punching jig. Furthermore, the support block supports the main frame of the reinforcing plate at the bottom end of the main frame, and the plurality of support feet formed at the bottom ends of the reinforcing frames of the reinforcing plate support the reinforcing frames of the reinforcing plate at the bottom ends of the reinforcing frames. Accordingly, the punching jig may be prevented from being bent when pressing load is applied to the punching jig by the rollers, so that accurate punching may be performed on the base material and also the cost required to replace the punching jig may be reduced.

Furthermore, the plurality of support plates are formed in the spaces between the reinforcing frames of the reinforcing plate, so that the reinforcing plate may be prevented from being bent when pressure is applied to the reinforcing plate.

In addition, a part of the scraps generated by a punching operation is introduced into the through holes of the punching needles is moved downward as it is introduced into the through holes at the support surface blocks and at the intersections of the reinforcing frames, and the remaining part thereof is moved downward as it is bounced off the inclined surfaces of the support plates. Accordingly, as soon as a punching operation is performed on the base material, scraps are immediately removed. As a result, scraps may be completely removed from the base material by a simple method, and also the rate of defective products attributable to scraps may be reduced.

Furthermore, as the punching jig on which a base material is seated is moved and pressed by the rollers, pressure is applied only through the bottom dead center of the rollers during punching, so that the impact transmitted to the base material and the punching needles may be reduced. Accordingly, the base material may be prevented from being pushed, bent or twisted by a strong impact, so that accurate punching may be performed and also damage to the punching needles may be prevented.

Moreover, a base material is pressed using the plurality of auxiliary rollers together with the main roller, so that the base material may be prevented from being pushed, bent or twisted. Accordingly, accurate punching may be performed, and the quality of products may be improved accordingly.

As described above, although the detailed description of the present invention has been made based on the embodiments with reference to the accompanying drawings, the above-described embodiments have only been described as preferred examples of the present invention. Therefore, it should not be understood that the present invention is limited only to the above-described embodiments, and the scope of the present invention should be understood based on the following claims and equivalent concepts thereof.

What is claimed is:

1. A press punching device, comprising:

a punching jig configured such that a plurality of punching needles are placed in respective first through holes formed in the punching jig, whereby the plurality of punching needles are coupled to the punching jig;

a reinforcing plate formed at a bottom end of the punching jig and configured to support the punching jig;

a base plate formed below the reinforcing plate and configured to be movable in a lateral straight line; and one or more rollers configured to press a base material when the base material is seated on the punching jig, wherein the reinforcing plate comprises:

a main frame configured to support circumferential edges of the punching jig at the bottom end of the punching jig; and a plurality of reinforcing frames formed inside the main frame, wherein each of the plurality of reinforcing frames has a thinner vertical thickness than the main frame, so that the plurality of reinforcing frames are spaced apart from a bottom surface of the punching jig by a predetermined distance.

2. The press punching device of claim 1, wherein one or more inclined surface are formed at a top end of each of the reinforcing frames.

3. The press punching device of claim 1, wherein a plurality of support surface blocks configured to support the punching jig are formed at top ends of the reinforcing frames of the reinforcing plate.

4. The press punching device of claim 3, wherein a plurality of second through holes are formed inside the support blocks.

5. The press punching device of claim 1, wherein a plurality of support feet are formed at bottom ends of the reinforcing frames of the reinforcing plate.

6. The press punching device of claim 1, wherein a plurality of support plates are formed in spaces between the reinforcing frames of the reinforcing plate and/or in spaces between the main frame and the reinforcing frames.

7. The press punching device of claim 6, wherein one or more inclined surfaces are formed on a top end surface of each of the support plates.

8. The press punching device of claim 1, further comprising:

a support block formed at a bottom end of the reinforcing plate and configured to support the reinforcing plate, wherein an inner space of the support block is used as a storage space for scraps.

* * * * *